L. E. FAGAN.
VEHICLE SPRING.
APPLICATION FILED DEC. 26, 1916.
1,280,432.
Patented Oct. 1, 1918.
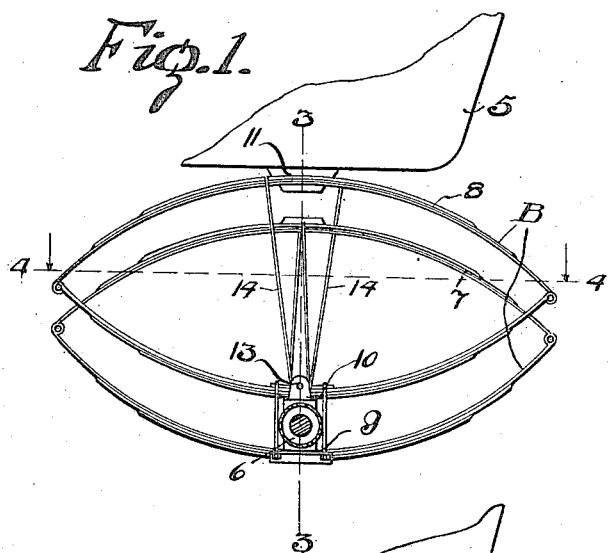
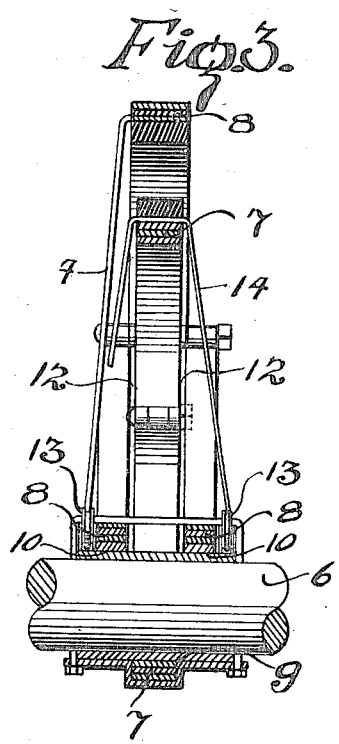
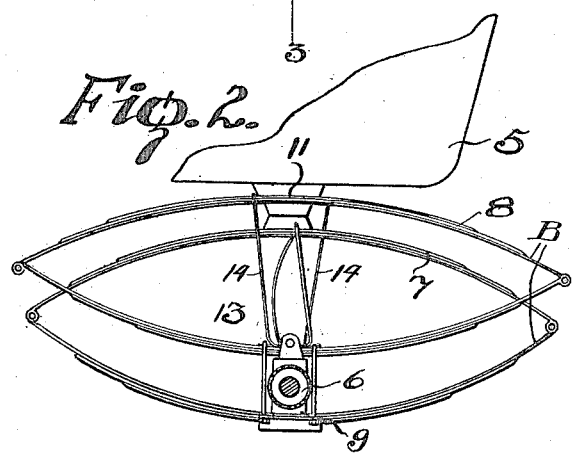
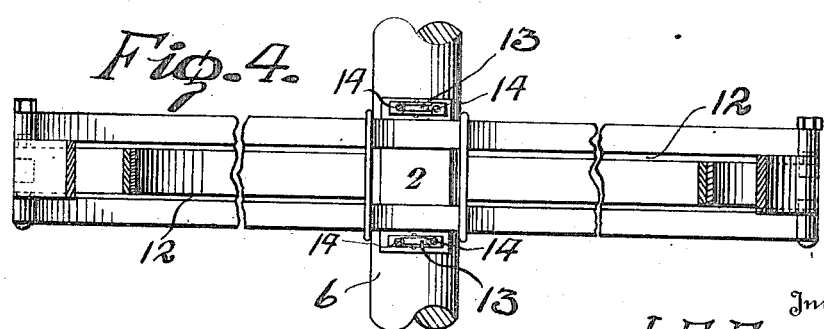
Inventor
L.E. Fagan.
Witnesses

UNITED STATES PATENT OFFICE.

LOVILO E. FAGAN, OF MERRIMAN, NEBRASKA.

VEHICLE-SPRING.

1,280,432.     Specification of Letters Patent.     Patented Oct. 1, 1918.

Application filed December 26, 1916. Serial No. 138,853.

*To all whom it may concern:*

Be it known that I, LOVILO E. FAGAN, a citizen of the United States, residing at Merriman, in the county of Cherry, State of Nebraska, have invented certain new and useful Improvements in Vehicle-Springs; and I do hereby declare the following to be a full, clear, and exact description of the invention, such as will enable others skilled in the art to which it appertains to make and use the same.

This invention relates to improvements in vehicle spring structures and has for one of its objects the provision of means of novel construction and arrangement for effectively absorbing the shocks and jars to which a vehicle may be subjected incident to travel.

A further object of the invention is to provide a vehicle spring structure embodying an initial sustaining spring, and a second spring adapted to receive a load jointly with the first spring when the latter shall have yielded under the load, the invention further embodying novel means for subjecting the second spring to the stress of rebound of the first spring whereby to enhance the easy riding qualities of the vehicle and at the same time materially reduce the possibility of spring breakage.

With the above and other objects of similar nature in view, the invention consists in the construction, combination and arrangement of parts set forth in and falling within the scope of the appended claim.

In the drawing:

Figure 1 is a fragmentary side elevation of the rear portion of an automobile with the invention associated therewith.

Fig. 2 is a view similar to Fig. 1 showing the springs compressed,

Fig. 3 is a sectional view taken on the line 3—3 of Fig. 1, and

Fig. 4 is a section taken on the line 4—4 of Fig. 1.

Referring now more particularly to the accompanaying drawing, there is conventionally shown the rear portion of an automobile A including the body 5 and axle 6.

The invention is designated generally at B and consists of a pair of "full elliptic" springs respectively designated by the numerals 7 and 8. These springs are arranged on the same side of the vehicle and are disposed in vertical alinement, the spring 7 having its lower semi-elliptic section secured to the under face of the axle 6 as indicated at 9, while the spring 8 has its corrresponding semi-elliptic section secured as at 10 to the upper face of the axle. The spring 8 furthermore has its upper semi-elliptic section fixedly secured as at 11 to the body 5 of the vehicle so that said spring constitutes the initial sustaining spring of the improved appliance. The lower semi-elliptic section of the spring 8 is constructed of spaced parallel leaf spring elements providing therebetween a longitudinally extending vertically opening guide slot 12 through which is loosely engaged for yielding movement, the upper semi-elliptic section of the spring 7.

As above explained, the spring 8 constitutes the initial sustaining spring for the vehicle body while the spring 7 is adapted to receive the load jointly with the first spring when the latter has yielded under the load, the springs being at all times maintained in vertical alinement by reason of the guide slot 12. However, as it is distinctly desirable to absorb the shock of rebound of the springs when the same are relieved of the load, I have provided and suitably fixed to the axle 6 a pair of pulleys 13, each of which has trained therearound a length of flexible belting 14 having its ends secured respectively to the upper semi-elliptic sections of the springs 7 and 8. Thus when the upper semi-elliptic section of the spring 8 moves upwardly under the stress of rebound, such movement is communicated to the corresponding section of the spring 7 through the medium of the beltings 14, the shock of rebound being in the manner effectively absorbed and the easy riding qualities of the vehicle materially enhanced.

What I claim is:—

The combination of a plurality of vertically disposed elliptical springs, one superposed relatively to the other, the superposed spring having its lower stretch formed in two sections spaced from each other to accommodate the lower spring, means for clamping the lower stretches of said springs to opposite sides of an axle, guides at the upper side of the axle and at opposite sides of the spring, and a flexible cable trained through the guides and having its ends fixed to the upper stretch of the uppermost spring and the intermediate portion fixed to the upper stretch of the lowermost spring.

In testimony whereof, I affix my signature, in the presence of two witnesses.

LOVILO E. FAGAN.

Witnesses:
MORRIS C. FAUGHMAN,
ADAH M. NELSON.

Copies of this patent may be obtained for five cents each, by addressing the "Commissioner of Patents, Washington, D. C."